(12) United States Patent
Shen (10) Patent No.: US 12,187,237 B2
(45) Date of Patent: Jan. 7, 2025

(54) SNOWBOARD CARRIER FOR AUTOMOBILE ROOF

(71) Applicant: Xiaoling Shen, Zhejiang (CN)

(72) Inventor: Xiaoling Shen, Zhejiang (CN)

(73) Assignee: Ningbo Pinchuan Auto Parts Co., Ltd., Ningbo (CN)

( * ) Notice: Subject to any disclaimer, the term of this patent is extended or adjusted under 35 U.S.C. 154(b) by 85 days.

(21) Appl. No.: 18/075,585

(22) Filed: Dec. 6, 2022

(65) Prior Publication Data
US 2024/0157887 A1    May 16, 2024

(30) Foreign Application Priority Data

Nov. 14, 2022    (CN) .......................... 202211418492.7

(51) Int. Cl.
*B60R 9/12*    (2006.01)
*B60R 9/058*    (2006.01)

(52) U.S. Cl.
CPC ................ *B60R 9/12* (2013.01); *B60R 9/058* (2013.01)

(58) Field of Classification Search
CPC .............. B60R 9/08; B60R 9/12; B60R 9/058
USPC .................................................. D12/406, 412
See application file for complete search history.

(56) References Cited

U.S. PATENT DOCUMENTS

| | | | |
|---|---|---|---|
| 1,351,493 A * | 8/1920 | Sigmond ................. | A47J 45/10 294/115 |
| 3,275,160 A * | 9/1966 | Zurker ..................... | B60R 9/12 248/214 |
| 3,638,844 A * | 2/1972 | Bronson ................... | B60R 9/12 224/323 |
| 4,516,709 A * | 5/1985 | Bott ......................... | B60R 9/12 224/325 |
| 5,119,980 A * | 6/1992 | Grim ........................ | B60R 9/12 292/85 |
| D332,243 S * | 1/1993 | Collins ..................... | D12/413 |
| 5,657,913 A | 8/1997 | Cucheran et al. | |
| 5,769,292 A * | 6/1998 | Cucheran ................. | B60R 9/045 224/321 |
| 5,938,090 A | 8/1999 | Dixon et al. | |
| D415,096 S * | 10/1999 | Englander ................ | D12/406 |
| 7,108,163 B1 * | 9/2006 | Pedrini .................... | B60R 9/12 224/323 |
| D555,573 S * | 11/2007 | Kemery .................... | D12/412 |
| 7,637,405 B2 * | 12/2009 | Emmerling ............. | B60R 9/055 224/330 |
| D628,949 S * | 12/2010 | Farber ....................... | D12/412 |
| 8,074,851 B2 * | 12/2011 | Settelmayer ............ | B60R 9/055 224/558 |

(Continued)

*Primary Examiner* — Justin M Larson (57) ABSTRACT

The present invention discloses a snowboard carrier for an automobile roof. One end of an upper clamping plate is hinged with one end of a lower clamping plate; a fixing frame is mounted on the lower clamping plate; the fixing frame includes a clamping jaw base and two clamping jaws arranged oppositely, and is rotatably mounted on the clamping jaw base through a hinge piece; and a clamping jaw adjusting mechanism is arranged between the lower clamping plate and the clamping jaw base, and can adjust an opening distance between the two clamping jaws. By adoption of the technical solution of the present invention, luggage rack aluminum rods of different sizes can be adapted by adjusting the opening distance between the two clamping jaws, and a sleigh can be taken by sliding out a sliding board.

10 Claims, 11 Drawing Sheets

(56) References Cited

U.S. PATENT DOCUMENTS

| | | | | |
|---|---|---|---|---|
| 8,136,709 B2* | 3/2012 | Jeli | ............................ | B60R 9/12 |
| | | | | 224/558 |
| 8,556,146 B2* | 10/2013 | Sautter | .................... | B60R 9/048 |
| | | | | 224/558 |
| 8,651,349 B2* | 2/2014 | Meissner | ................ | B60R 9/055 |
| | | | | 224/570 |
| 8,757,457 B2* | 6/2014 | Settelmayer | ............ | B60R 9/055 |
| | | | | 224/319 |
| 8,807,407 B2* | 8/2014 | Hubbard | ................. | B60R 9/045 |
| | | | | 224/319 |
| 8,864,504 B1* | 10/2014 | Gretz | ....................... | H01R 4/66 |
| | | | | 439/100 |
| D727,245 S * | 4/2015 | Patel | ............................ | D12/414 |
| 9,126,540 B2* | 9/2015 | Bogoslofski | ............ | B60R 9/055 |
| 9,266,478 B2* | 2/2016 | Patel | ....................... | B60R 9/058 |
| 9,694,757 B2* | 7/2017 | Sautter | .................... | B60R 9/052 |
| 10,543,771 B2* | 1/2020 | Sautter | ....................... | B60P 3/34 |
| 10,703,293 B2* | 7/2020 | Dickinson | ............... | B60R 9/055 |
| 11,351,928 B2* | 6/2022 | D'Angelo | ............ | B25B 23/1427 |
| D1,027,798 S * | 5/2024 | Shen | ............................ | D12/412 |
| 2005/0274756 A1* | 12/2005 | Seys | ....................... | B60R 9/048 |
| | | | | 224/319 |
| 2012/0261449 A1* | 10/2012 | Jeli | ............................ | B60R 9/12 |
| | | | | 224/323 |
| 2017/0203700 A1 | 7/2017 | Magnusson et al. | | |
| 2024/0157887 A1* | 5/2024 | Shen | ......................... | B60R 9/12 |

* cited by examiner

SNOWBOARD CARRIER FOR AUTOMOBILE ROOF

FIELD OF TECHNOLOGY

The present invention relates to the technical field of auto parts, and in particular to a snowboard carrier for an automobile roof.

BACKGROUND

With the development of the national economy and the improvement of people's living standard, the status of automobiles in people's production and life has become more and more important. Many automobile roofs are provided with vehicle-mounted luggage racks. The vehicle-luggage rack generally includes two cross rods. Carrying racks such as bicycle racks, snowboards, kayaks, roof boxes and roof baskets can be carried on the cross rack.

With the improvement of people's living standard, people's leisure and entertainment methods are more and more diversified. Skiing has become one of the most popular forms of leisure and entertainment in recent years. In order to facilitate carrying a skiing device such as a snowboard/a sleigh on the automobile roof, it is necessary to mount a special mounting bracket (such as a sleigh rack) on the luggage rack. According to a roof sleigh rack convenient for mounting with the notification number CN214112425U, a part for fixing the sleigh rack adopts a space formed through cooperation between a clamping footstand and a U-shaped screw rod, to clamp an aluminum rod of the luggage rack. When the structure is used, two ends of the U-shaped screw rod are fastened by nuts, so it is tedious in mounting and dismounting process and inconvenient in use. In addition, a locking nut of the U-shaped screw rod is exposed on the luggage rack and does not have an anti-theft function, which can easily cause the loss of the sleigh rack and the sleigh.

SUMMARY

Firstly, to solve the mounting convenience problem between a sleigh rack and a luggage rack, the present invention provides a snowboard carrier for an automobile roof. The carrier adopts a clamping jaw mechanism to fix the whole structure on the luggage rack rapidly and conveniently, thereby achieving convenient and simple mounting operation. To achieve the above objective, the present invention adopts the following technical solution:

a snowboard carrier for an automobile roof includes a sleigh rack, where a fixing frame is mounted on the sleigh rack, and the key is: the fixing frame includes a clamping jaw base and two clamping jaws; the clamping jaw base is mounted on the sleigh rack; the two clamping jaws are arranged oppositely and are rotatably mounted on the clamping jaw base; and the clamping jaw base is, provided with a clamping jaw adjusting structure, and the clamping jaw adjusting mechanism acts on the clamping jaws to make the clamping jaws rotate, thereby adjusting an opening distance between the two clamping jaws.

By adoption of the technical solution, the opening distance between the two adjusting jaws is adjusted through the clamping jaw adjusting structure, so that an aluminum rod of the luggage rack is firmly grasped by the clamping jaws and fixed on the automobile roof. The snowboard carrier for an automobile roof has the advantage of convenient and simple operation, can adapt to different sizes of aluminum rods of the luggage racks, and has high applicability.

Further, the clamping jaw adjusting structure is a telescopic assembly, a telescopic direction of the telescopic assembly is perpendicular to a rotating center line of the clamping jaws, and the telescopic moving part of the telescopic assembly is linked with the clamping jaws so as to push the clamping jaws to rotate about the hinge piece.

Further, the clamping jaw adjusting structure is a rotating assembly, the hinge piece is fixedly connected to the clamping jaws in a circumferential direction, and an output shaft of the rotating assembly is in transmission connection with the hinge piece so as to drive the clamping jaws to rotate about the hinge piece.

Further, the clamping jaw adjusting structure is a cam assembly, and a cam of the cam assembly acts on the clamping jaws to drive the clamping jaws to rotate about the hinge piece.

Further, the clamping jaw adjusting structure is a clamping force-accumulating assembly, the clamping force-accumulating assembly includes a force-accumulating spring, and the force-accumulating spring is connected between the clamping jaws and the clamping jaw base; and when the clamping jaws respectively rotate about the hinge piece and a distance between the two clamping jaws is increased, the clamping jaws compress the force-accumulating spring to accumulate energy, such that the force-accumulating spring generates a tendency to push the two clamping jaws to rotate and reduce the distance.

Further, the clamping jaw base is box-shaped, a tail part of each of the clamping jaws is rotatably mounted in the clamping jaw base, the clamping jaw base is provided with avoidance openings respectively corresponding to the two clamping jaws, a head part of each of the clamping jaws extends out of the corresponding avoidance opening to form a clamping part, and the clamping part is away from the sleigh rack.

Further, the telescopic assembly includes an adjusting bolt and an adjusting nut sleeved with the adjusting bolt in a threaded manner; and a telescopic limiting piece is arranged on the clamping jaw base, the telescopic limiting piece acts on the adjusting nut to restrain the adjusting nut from advancing and retreating along an axial direction of the adjusting bolt, and the adjusting bolt is linked with the clamping jaws to drive the clamping jaws to rotate about the hinge piece.

Further, the sleigh rack includes an upper clamping plate and a lower clamping plate which cooperate with each other, and the upper clamping plate is assembled on the lower clamping plate in an opening and closing manner; the fixing frame is mounted on the lower clamping plate, the adjusting bolt movably passes through the lower clamping plate and extends into the clamping jaw base, and a head part of the adjusting bolt is located between the upper clamping plate and the lower clamping plate; after the upper clamping plate is opened relative to the lower clamping plate, the head part of the adjusting bolt is exposed; and after the upper plate is closed relative to the lower clamping plate, the head part of the adjusting bolt is hidden in the sleigh rack.

Further, the tail ends of the two clamping jaws are located between the head part of the adjusting bolt and the adjusting nut, and the tail ends of the two clamping jaws respectively abut against the adjusting nut;

the hinge piece is a pin shaft, an expanding torsional spring is sleeved on the rotating pin shaft, and two ends of the expanding torsional spring are respectively fixed on the clamping jaws and the clamping jaw base; and when the adjusting nut moves towards the head part of the adjusting bolt, the two clamping jaws are pushed to move, so that the head parts of the two clamping jaws are close to each other, and the expanding torsional spring is compressed to accumulate energy.

Further, the sleigh rack is long strip-shaped, and one fixing frame is mounted at each of two ends of the sleigh rack.

Further, a bolt adjusting wrench is movably embedded in the sleigh rack.

Further, the adjusting nut is connected to a limiting block, the clamping jaw base is provided with a limiting groove corresponding to the limiting block, the limiting block is assembled in the limiting groove, a length direction of the limiting groove is parallel to a length direction of the adjusting bolt, and the limiting block is retrained by the limiting groove to move along the length direction of the limiting groove.

Further, the upper clamping plate is superimposed on the lower clamping plate, either ends of the upper clamping plate and the lower clamping plate are hinged mutually, and lock catch connecting mechanisms are arranged at free ends of the upper clamping plate and the lower clamping plate.

Further, it is necessary to perform further optimized design for the specific structure and mounting mode of the clamping jaw adjusting structure and other technological details and for solving the anti-theft problem; and the details are described in the specific embodiments.

BRIEF DESCRIPTION OF THE DRAWINGS

The drawings of the specification that constitutes a part of the present application are used to provide a further understanding of the present invention. The exemplary embodiments of the present invention and the description thereof are used to explain the present invention, and do not constitute an improper limitation of the present invention. In the drawings.

DESCRIPTION OF REFERENCE NUMERALS

1—upper clamping plate; 101—cover plate; 102—upper three-dimensional part;

2—lower clamping plate; 2b—fixing plate; 2a—sliding plate; gal-lower three-dimensional part; 2a2—flat plate part;

3—fixing frame; 301—clamping jaw base; 302—clamping jaw; 303—rotating pin shaft; 304—expanding spring;

4—adjusting bolt; 5—adjusting nut; 6—limiting groove; 7—first lower cover;

8—first upper cover; 801—fixed cover body; 802—pressing type cover body; 803—cover body rotating shaft; 804—cover body torsional spring; 805—anti-theft lock;

9—lower sealing end cover; 10—regulating and control vertical plate; 11—connecting plate; 12—movable vertical plate; 13—locking plate; 14—regulating and control hole; 15—regulating and control handle; 16—locking part; 17—adjusting knob; 18—bolt adjusting wrench; 19—sliding plate sealing cover; 20—second upper cover; 21—second lower cover; 22—hinge torsional spring; 23—hinge rotating shaft.

DETAILED DESCRIPTION OF THE EMBODIMENTS

The present invention is described in detail below with reference to the accompanying drawings and embodiments. Each example is provided to explain the present invention instead of limiting the present invention. In fact, those skilled in the art will appreciate that modifications and variations may be made in the present invention without departing from the scope or spirit of the present invention. For example, features shown or described as one part of one, embodiment may be applied to another embodiment to generate yet another embodiment. Therefore, it is expected that the present invention includes such modifications and variations that fall within the scope of the appended claims and their equivalents.

In the description of the present invention, orientation or position relationships indicated by terms "longitudinal", "transverse", "upper", "lower", "front", "rear", "left", "right", "vertical", "horizontal", "top", "bottom" and the like are orientation or position relationships shown in the drawings, and these terms are merely for facilitating description of the present invention, but not for requiring that the present invention must be constructed and operated in a specific orientation, and thus, these terms cannot be understood as a limitation to the present invention. As used in the present invention, the terms "connected", "connection" and "set" should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

The accompanying drawings show one or a plurality of examples of the present invention. The detailed description uses reference numerals and letters to refer to the features in the accompanying drawings. Similar numeral references in the drawings and description have been used to refer to the similar parts in the present invention. As used herein, the terms "first", "second" and "third" are used interchangeably to distinguish one component from another component, and are not intended to indicate the position or importance of individual components.

As shown in FIG. 1 to FIG. 8, according to the embodiments of the present invention, a snowboard carrier for an automobile roof includes a sleigh rack, where a fixing frame 3 is mounted on the sleigh rack, and the fixing frame 3 includes a clamping jaw base 301 and two clamping jaws 302; the clamping jaw base 301 is mounted on the sleigh rack; the two clamping jaws 302 are arranged oppositely and are rotatably mounted on the clamping jaw base 301; and the clamping jaw base 301 is provided with a clamping jaw adjusting structure, and the clamping jaw adjusting mechanism acts on the clamping jaws 302 to make the clamping jaws rotate, thereby adjusting an opening distance between the two clamping jaws 302.

In a specific implementation manner of the clamping jaw base 301, the clamping jaw base 301 is box-shaped, a tail part of each of the clamping jaws 302 is rotatably mounted in the clamping jaw base 301, the clamping jaw base 301 is provided with avoidance openings respectively corresponding to the two clamping jaws 302, a head part of each of the clamping jaws 302 extends out of the corresponding avoidance opening to form a clamping part, and the clamping part is away from the sleigh rack. The clamping jaws 302 are roughly L-shaped so as to improve the stability after clamping.

The clamping part may be coated with a soft material (such as a rubber pad) to protect the aluminum rod of the luggage rack. Similarly, a part where an outer wall of the clamping jaw base 301 is in contact with the aluminum rod of the luggage rack may also be coated with a soft material.

Generally, the sleigh rack is long strip-shaped; and considering the mounting stability and economy, one fixing frame 3 is mounted at each of two ends of the sleigh rack.

To facilitate the mounting of the snowboard/sleigh, the sleigh rack includes an upper clamping plate 1 and a lower clamping plate 2 which cooperate with each other, and the upper clamping plate 1 is assembled on the lower clamping plate 2 in, an opening and closing manner; the specific opening-closing assembling mode includes a sliding drawing mode and a flipping mode; and the fixing frame 3 is mounted on the lower clamping plate 2. A more specific opening-closing assembling mode is: the upper clamping plate 1 is superimposed on the lower clamping plate 2, either ends of the upper clamping plate 1 and the lower clamping plate 2 are hinged mutually, the snowboard/sleigh is clamped between the upper clamping plate 1 and the lower clamping plate 2, lock catch connecting mechanisms are arranged at free ends of the upper clamping plate 1 and the lower clamping plate 2 so as to rapidly open or lock the upper clamping plate 1 and the lower clamping plate 2, the lock catch connecting mechanisms may adopt any existing forms and are mainly used to implement locked connection and separation of the upper clamping plate 1 and the lower clamping plate 2, and the lock catch connecting mechanisms adopt mechanical locks with keys based on the anti-theft perspective.

The specific form of the clamping jaw adjusting structure includes but is not limited by the following four forms: a telescopic form, a rotating form, a cam form and a force-accumulating form. As a further explanation, various forms of clamping jaw adjusting structures are respectively described in detail:

(I) the clamping jaw adjusting structure is a telescopic assembly, a telescopic direction of the telescopic assembly is perpendicular to a rotating center line of the clamping jaws 302, and the telescopic moving part of the telescopic assembly is linked with the clamping jaws 302 so as to push the clamping jaws 302 to rotate about the hinge piece.

Of course, the telescopic assembly also has various structures, such as a guide rod-sleeve structure, a sliding rail-sliding block structure and a screw rod-nut structure. It is necessary to set a corresponding mounting position on the clamping jaw base 301. The mounting modes of various forms of telescopic assemblies are well known to those skilled in the art, and will not be described in detail herein. Those skilled in the art have the following common knowledge: in practical application, "guide rod" or "sleeve", "sliding rail" or "sliding block" and "screw rod" or "nut" may all form the telescopic part moving part; and the telescopic moving part may abut against the clamping jaws 302, or may be hinged through a connecting rod.

(II) The clamping jaw adjusting structure is a rotating assembly, the hinge piece is fixedly connected to the clamping jaws 302 in a circumferential direction, and an output shaft of the rotating assembly is in transmission connection with the hinge piece so as to drive the clamping jaws to rotate about the hinge piece, and drives the clamping jaws 302 to rotate about the hinge piece.

The output shaft of the rotating assembly may be coaxially connected to the hinge piece for direct driving.

Generally, an input shaft and the output shaft of the rotating assembly may be integrated into one to simplify the structure, that is, the input and output of rotating power are on the same shaft. The rotating assembly may also be set as a one-stage or multi-stage transmission system (such as gear), so that the input shaft and the output shaft, are independent of each other.

The driving mode of the rotating assembly may be electrical or manual. When manual driving is adopted, the input shaft of the rotating assembly may be connected to a rocker arm perpendicular to the input shaft.

A mounting area for mounting the rotating assembly is arranged on the clamping jaw base 301, and the rotating assembly (shaft) is mounted on the clamping jaw base 301 through a bearing.

(III) The clamping jaw adjusting structure is a cam assembly, and a cam of the cam assembly acts on the clamping jaws 302 to drive the clamping jaws 302 to rotate about the hinge piece.

The cam assembly further includes a camshaft, the camshaft is mounted on the clamping jaw base 301 through a bearing, the cam is mounted on the camshaft, and the driving mode of the camshaft may be electrical or manual. When manual driving is adopted, the input shaft of the rotating assembly may be connected to a rocker arm perpendicular to the input shaft.

(IV) The clamping jaw adjusting structure is a clamping and force-accumulating assembly, the clamping and force-accumulating assembly includes a force-accumulating spring, and the force-accumulating spring is connected between the clamping jaws 302 and the clamping jaw base 301.

The force-accumulating spring may be a force-accumulating torsional spring, or may be a force-accumulating pressure spring. The function of the force-accumulating spring is: when the clamping jaws respectively rotate about the hinge piece and a distance between the two clamping jaws 302 is increased, the clamping jaws 302 compress the force-accumulating spring to accumulate energy, such that the force-accumulating spring generates a tendency to push the two clamping jaws 302 to rotate and reduce the distance.

As a preferred solution, in the above first manner, the telescopic assembly includes an adjusting bolt 4 and an adjusting nut 5 sleeved with the adjusting bolt, in a threaded manner; a telescopic limiting piece is arranged on the clamping jaw base 301, the telescopic limiting piece acts on the adjusting nut 5 so as to restrain the adjusting nut to advance and retreat along an axial direction of the adjusting bolt 4, and the adjusting bolt 4 is linked with the clamping jaws 302 to drive the clamping jaws to rotate about the hinge piece.

To achieve the anti-theft function of the sleigh rack, the adjusting bolt 4 movably passes through the lower clamping plate 2 and extends into the clamping jaw base 301, and a head part of the adjusting bolt 4 is located between the upper clamping plate 1 and the lower clamping plate 2;

after the upper clamping plate 1 is opened relative to the lower clamping plate 2, and the head part of the adjusting bolt 4 is exposed for a user to adjust: and after the upper clamping plate 1 is closed relative to the lower clamping plate 2, the head part of the adjusting bolt 4 is hidden in the sleigh rack, specifically between the upper clamping plate 1 and the lower clamping plate 2.

Tail ends of the two clamping jaws 302 are located between the head part of the adjusting bolt 4 and the adjusting nut 5, and the tail ends of the two clamping jaws 302 respectively abut against the adjusting nut 5.

The hinge piece is a rotating pin shaft 303, an expanding torsional spring 304 is sleeved on the rotating pin shaft 303, and two ends of the expanding torsional spring 304 are respectively hooked on the clamping jaws 302 and the clamping jaw base 301. The specific process of clamping and opening the two clamping jaws 302 is as follows: when the adjusting bolt 4 rotates, the adjusting nut 5 is limited and restrained by the telescopic limiting piece to move towards the head part of the adjusting bolt 4 and push the two clamping jaws 302 to rotate, so that the head parts of the two clamping jaws 302 are close to each other to be clamped, the aluminum rod of the luggage rack is grasped, and the expanding torsional spring 304 is compressed to accumulate energy, and when the adjusting bolt 4 rotates reversely, the adjusting nut 5 is limited and restrained by the telescopic limiting piece to move towards the tail part of the adjusting bolt, and the expanding torsional spring 304 releases the accumulated energy, so that the two clamping jaws 302 rotate reversely to be opened.

In a normal state, the clamping jaws 302 are in an open state, so that the expanding torsional spring 304 is in a relaxed state, and the service time of the expanding torsional spring 304 can be prolonged. The clamping jaws 302 are constantly in an "open" or "clamped" state, thereby simplifying the operation step during mounting and dismounting. The adjusting bolt 4, the adjusting nut 5 and the expanding torsional spring 304 cooperate with each other to control the clamping jaws 302 to rotate, so the structure is simple, and the cost and the failure rate can be greatly reduced.

For the convenience of users, a bolt adjusting wrench 18 is movably embedded in the sleigh rack. The bolt adjusting wrench 18 may be movably inserted into the sleigh rack in any manner. Preferably, the bolt adjusting bench 18 is placed between the upper clamping plate 1 and the lower clamping plate 2. More preferably, the bolt adjusting wrench 18 is movably inserted on the lower clamping plate 2. Generally, the bolt adjusting wrench 18 is an Allen wrench, and the adjusting bolt 4 is a hexagon socket screw.

One specific implementation manner of the telescopic limiting piece is: the adjusting nut 5 is connected to a limiting block, the clamping jaw base 301 is provided with a limiting groove 6 corresponding to the limiting block, the limiting block is assembled in the limiting groove 6, the limiting block and the limiting groove 6 cooperate with each other to form the telescopic limiting piece, a length direction of the limiting groove 6 is parallel to a length direction of the adjusting bolt 4, and the limiting block is restrained by the limiting groove 6 to move along the length direction of the limiting groove.

To facilitate manufacturing and mounting, the clamping jaw base 301 has a split structure, and includes a base and a box body covering the base.

The upper clamping plate 1 ad the lower clamping plate 2 are made of profiles. End part shell pieces for shielding, connecting and mounting are respectively arranged on end parts of the upper clamping plate 1 and the lower clamping plate 2. Specifically, the lower clamping plate 2 includes a lower clamping plate body and a first lower cover 7, the first lower cover 7 is mounted at a free end of the lower clamping plate body, the upper clamping plate 1 includes an upper clamping plate and a first upper cover 8, the first upper cover 8 is mounted at a free end of the upper clamping plate body, and the lock catch connecting mechanism is arranged between the first lower cover 7 and the first upper cover 8. Based on this, the lock catch connecting mechanism includes an anti-theft lock 805. The first lower cover 7 and, the first upper cover 8 may be locked by the anti-theft lock 805, thereby preventing opening without the consent of a user.

The lower clamping plate body has a split structure, and further includes a strip-plate-shaped fixed plate 2b and a sliding plate 2a. The sliding plate 2a is slidingly mounted, on the fixed plate 2b, the upper clamping plate 1 is hinged with the fixed plate 2b, a sliding direction of the sliding plate 2a is consistent with a length direction of the fixed plate ab, the first lower cover 7 is connected to a free end of the sliding plate 2a, a lower sealing end cover 9 is mounted at a free end of the fixed plate 2b, and the fixing frame 3 is mounted on the fixed plate 2b.

The first upper cover 8 further includes a fixed cover body 801 mounted on the upper clamping plate 1, and the anti-theft lock 805 is used to lock and unlock the first lower cover 7 and the fixed cover body 801.

A pressing cover body 802 is further mounted on the fixed cover body 801. Specifically, the fixed cover body 801 is provided with a cover hole, the pressing cover body 802 is arranged at the cover hole and is rotatably connected to the fixed cover body 801 through a cover body rotating shaft 803, a cover body torsional spring 804 is mounted on the cover body rotating shaft 803, one end of the cover body torsional spring 804 abuts against an inner wall of the fixed cover body 801 and the other end of the cover body torsional spring 804 abuts against an inner wall of the pressing cover body 802, a hook-shaped part is arranged on a lower part of the pressing cover body 802, the first lower cover 7 is provided with a groove corresponding to the hook-shaped part, and when the hook-shaped part is hooked in the groove, the pressing cover body 802 is in a closed state, and the pressing cover body 802 is pressed to rotate by a certain angle to make the hook-shaped part be separated from the groove, thereby unlocking the pressing cover body 802.

A sliding plate 2a has a more specific structure as follows: the sliding plate 2a includes a flat plate part 2a2 and an arched lower three-dimensional part 2a1, and the lower three-dimensional part 2a1 is mounted on the flat plate part 2a2.

The upper clamping plate 1 has a more specific structure as follows: the upper clamping plate 1 includes a cover plate 101 and an upper three-dimensional part 102, the cover body 101 is arranged on a surface of the upper three-dimensional part 102, and the upper three-dimensional part 102 corresponds to the lower three-dimensional part 2a1.

The flat plate part 2a2 is slidingly arranged on the fixed plate 2b. Specifically, a sliding groove is formed in a lower surface of the flat plate part 2a2, a convex strip corresponding to the sliding groove is arranged on an upper surface of the fixed plate 2b, the convex strip is movably inserted into the sliding groove, so that the flat plate part 2a2 can slide relative to the fixed plate 2b. The flat plate part 2a2, the fixed plate 2b and the cover plate 101 are generally made of aluminum profiles.

The clamping jaw base 301 is fixedly mounted on the fixed plate 2b, the flat plate part 2a2 is provided with a circular clamping jaw adjusting hole corresponding to the adjusting bolt 4, and a free end of the lower three-dimensional part 2a1 is slightly shorter than the flat plate part 2a2, so that the clamping jaw adjusting hole can be exposed after the first upper cover 8 is opened.

A second upper cover 20 is mounted at a hinge end of the upper clamping plate 1, a second lower cover 21 is mounted at a hinge end of the fixed plate 2b, the second upper cover 20 and the second lower cover 21 are hinged through a hinge rotating shaft 23, a hinge torsional spring 22 is mounted on the hinge rotating shaft 23, one end of the hinge torsional spring 22 abuts against the second upper cover 20 and the other end of the hinge torsional spring 22 abuts against the second lower cover 21, and a sliding plate sealing cover 19 is mounted at one end, away from the first lower cover 7, of the sliding plate 2a. Specifically, the sliding plate sealing cover 19 is mounted on the flat plate part 2a2, and when the sliding plate 2a slides out and the sliding plate sealing cover 19 interferes with the lower sealing end cover 9, the flat plate part 2a2 of the sliding plate 2a-arrives at a sliding limit and stops.

A sliding locking structure is arranged between the lower sealing end cover 9 and the sliding plate 2a. It can be seen from FIG. 2 and FIG. 3 that the sliding locking structure is located on apart, longer than the lower three-dimensional part 2a1, of the flat plate part 2a2. The sliding locking structure includes a regulating and control, vertical plate 10, a connecting plate 11, a movable vertical plate 12 and a locking plate 13.

The regulating and control vertical plate 10 is arranged on the first lower cover 7, the regulating and control vertical plate 10 is provided with an arc-shaped regulating and control hole 14, the connecting plate 11 is mounted on the flat plate part 2a2 of the sliding plate 2a, the movable vertical plate 12 is rotatably mounted on the connecting plate 11, an upper end of the movable vertical plate 12 bends and passes through the regulating and control hole 14 to form a regulating and control handle 15, an adjusting knob 17 is mounted on the regulating and control handle 15, and a lower end of the movable vertical plate 12 bends to form a locking part 16.

Figure 1:
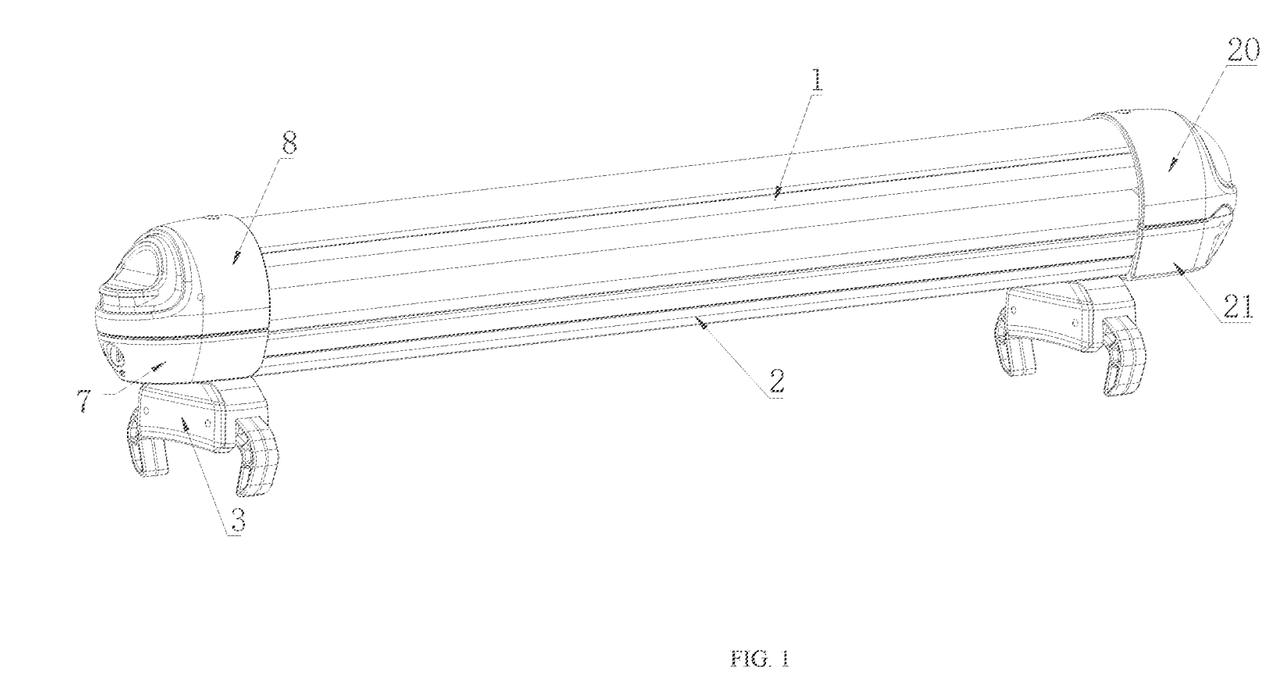
FIG. 1 is a three-dimensional schematic diagram of the present invention.
Figure 2:
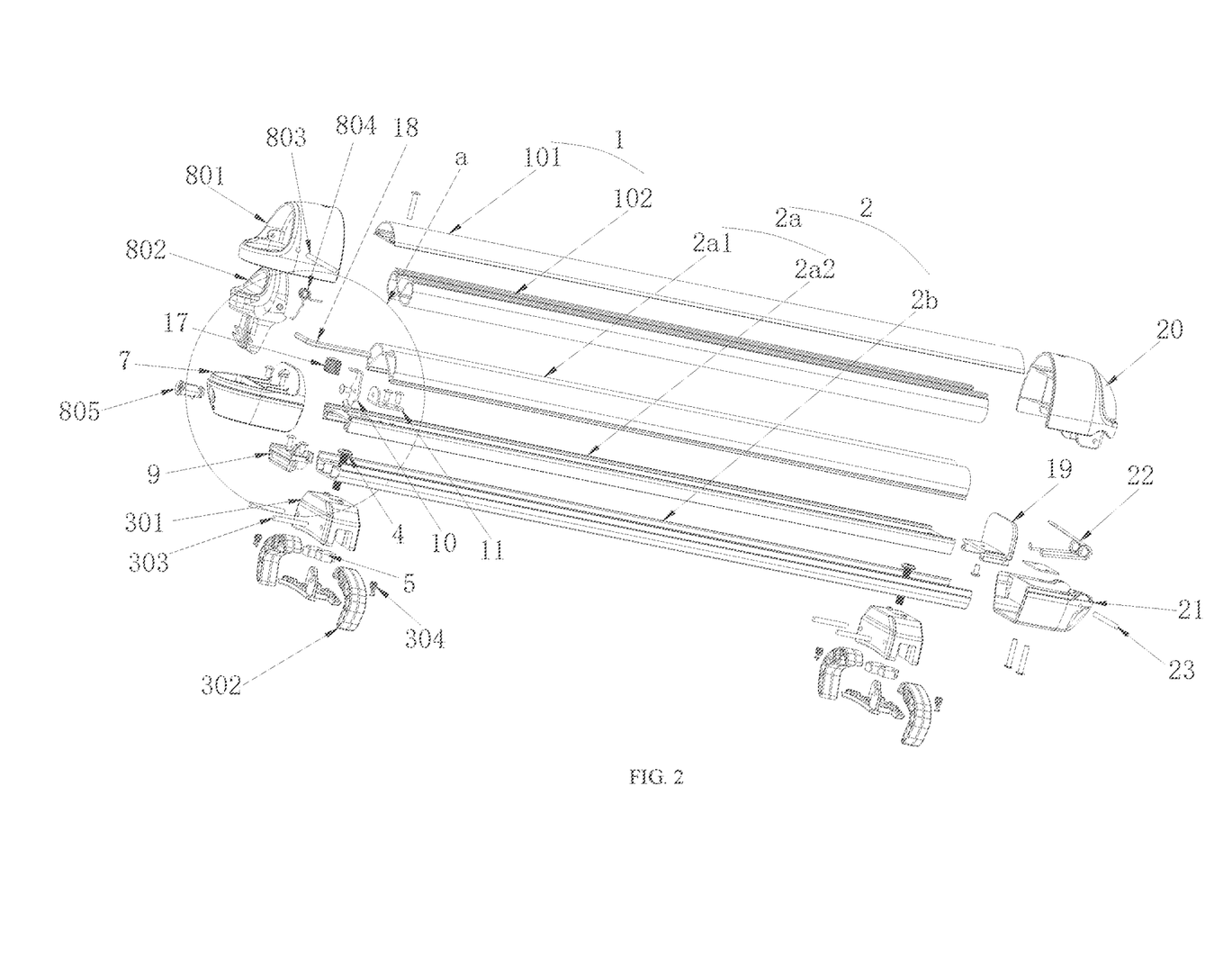
FIG. 2 is an exploded view of FIG. 1.
Figure 3:
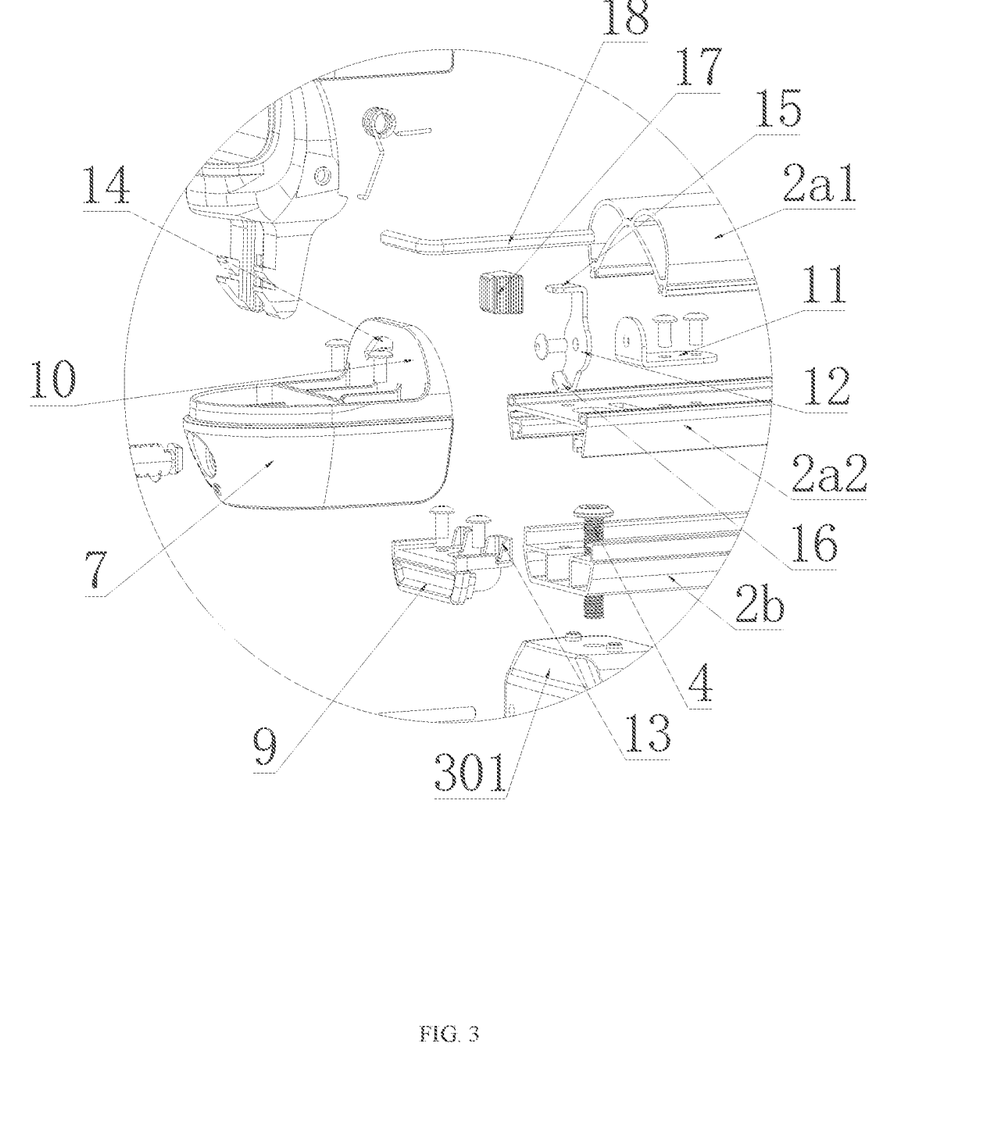
FIG. 3 is an enlarged diagram of a portion a in FIG. 2.
Figure 4:
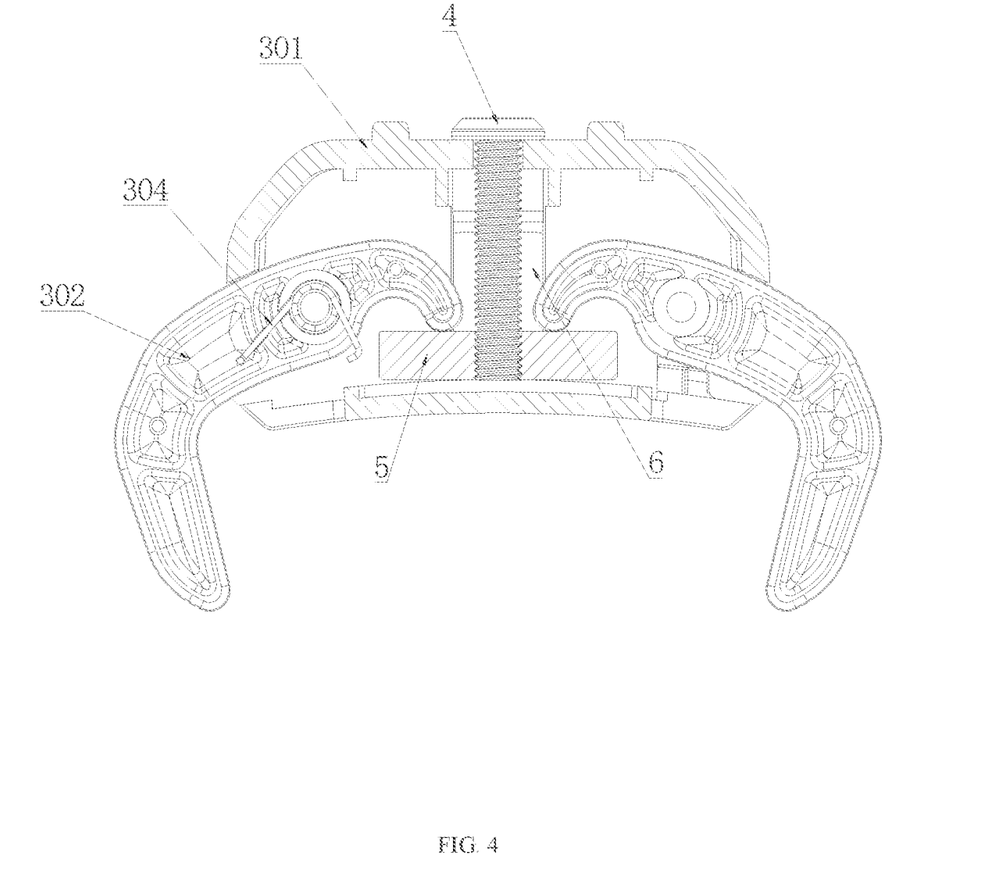
FIG. 4 is a schematic diagram when clamping jaws of a fixing frame are opened.
Figure 5:
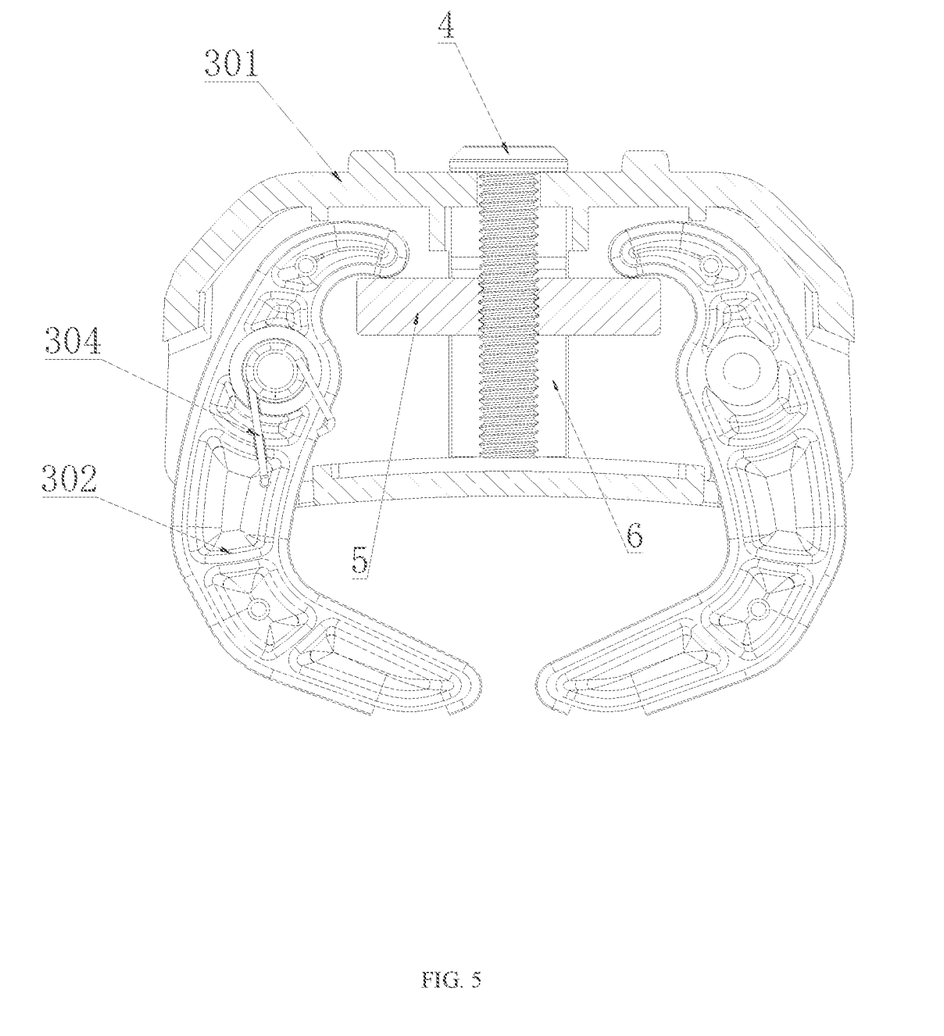
FIG. 5 is a schematic diagram when clamping jaws of a fixing frame are closed.
Figure 6:
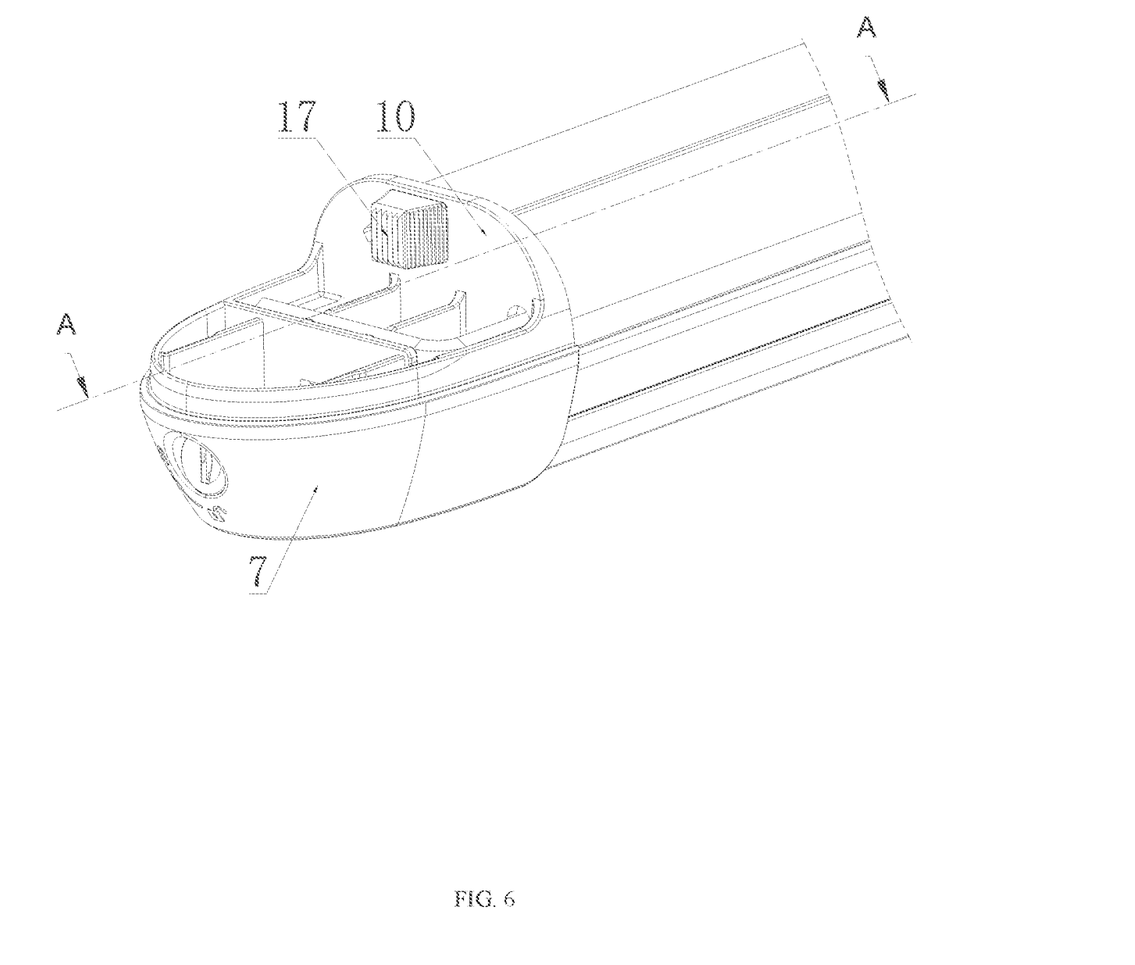
FIG. 6 is a structural schematic diagram of an end part of a sliding plate.
Figure 7:
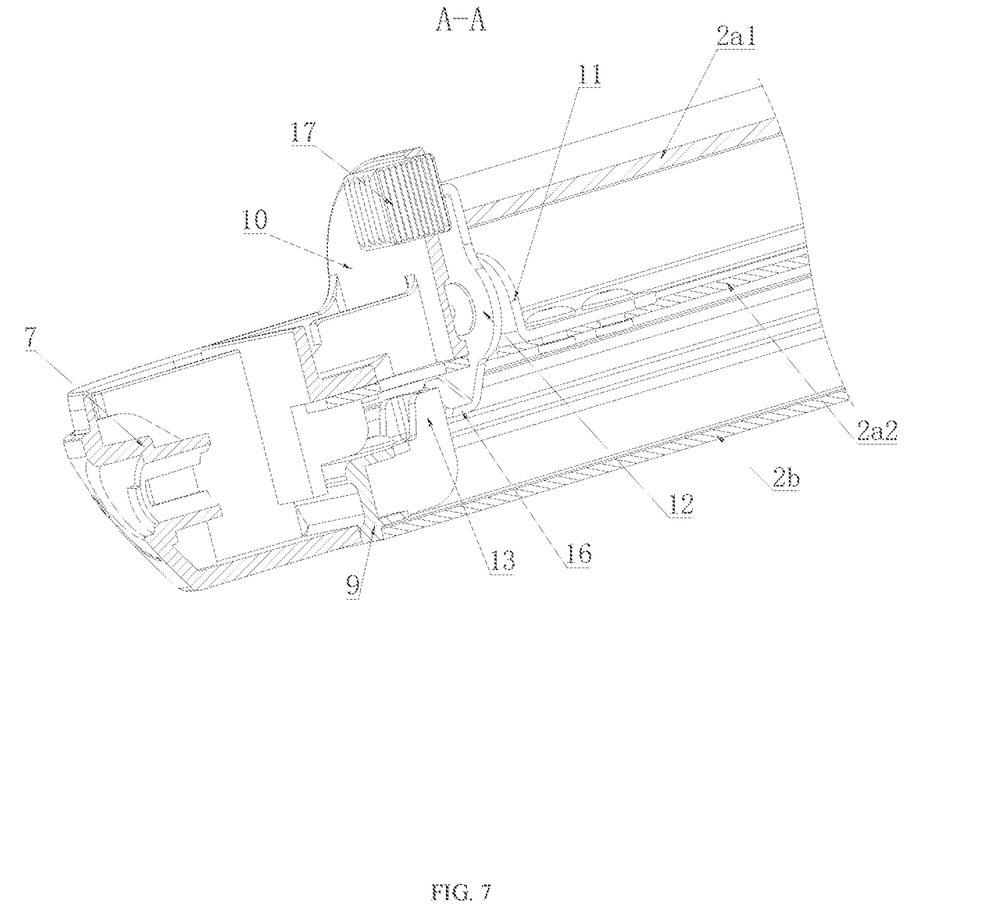
FIG. 7 is an A-A sectional of FIG. 6.
Figure 8:
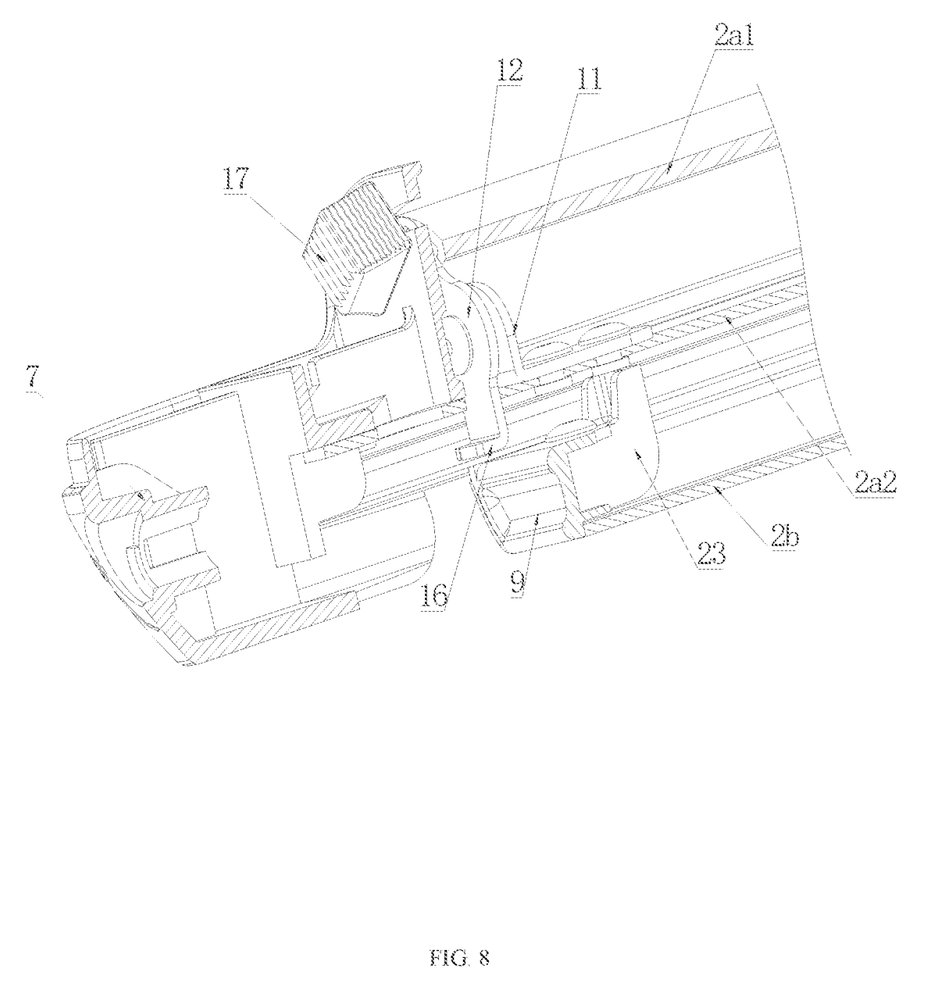
FIG. 8 is a schematic diagram in which a sliding locking structure is unlocked and a sliding plate slides out.

The locking plate 13 is arranged on the lower sealing end cover 9. As shown in FIG. 7, when the locking part 16 is in contact with the locking plate 13, the sliding plate 2a is locked. As shown in FIG. 8, the regulating and control handle 15 rotates to make the locking part 16 be separated from the locking plate 13, and the sliding plate 2a is unlocked. At this time, the sliding plate 2a can slide. In this embodiment, unlocking can be, implemented after counterclockwise rotation by a certain degree.

The regulating and control vertical plate 10 is provided with a wrench inserting hole, the bolt adjusting wrench 18 passes through the wrench inserting hole and then extends into the lower three-dimensional part 2a1, and the bolt adjusting wrench 18 is generally an L-shaped wrench.

Figure 9:
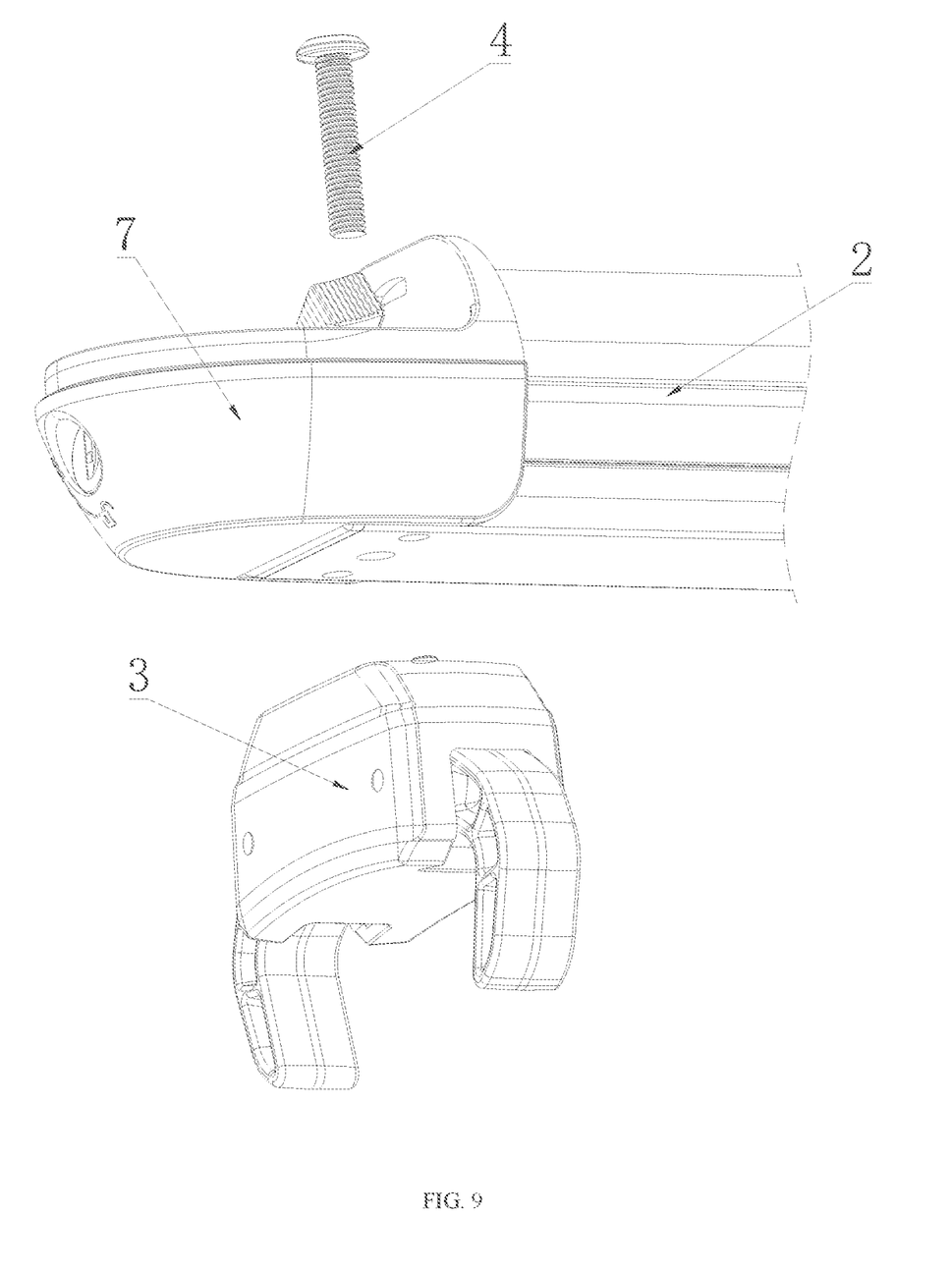
FIG. 9 is a schematic diagram in which one of fixing frames is mounted.
Figure 10:
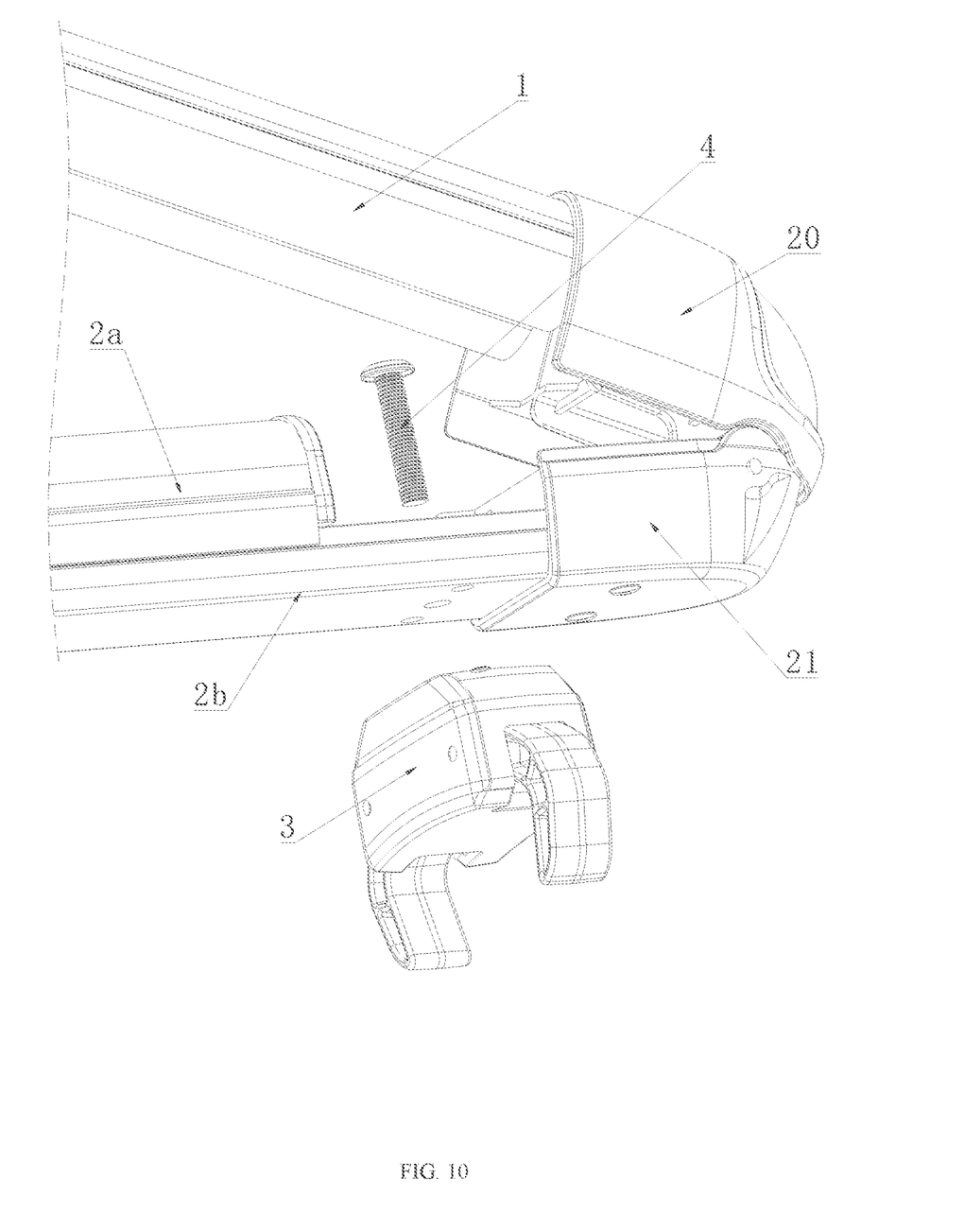
FIG. 10 is a schematic diagram in which another fixing frame is mounted.
Figure 11:
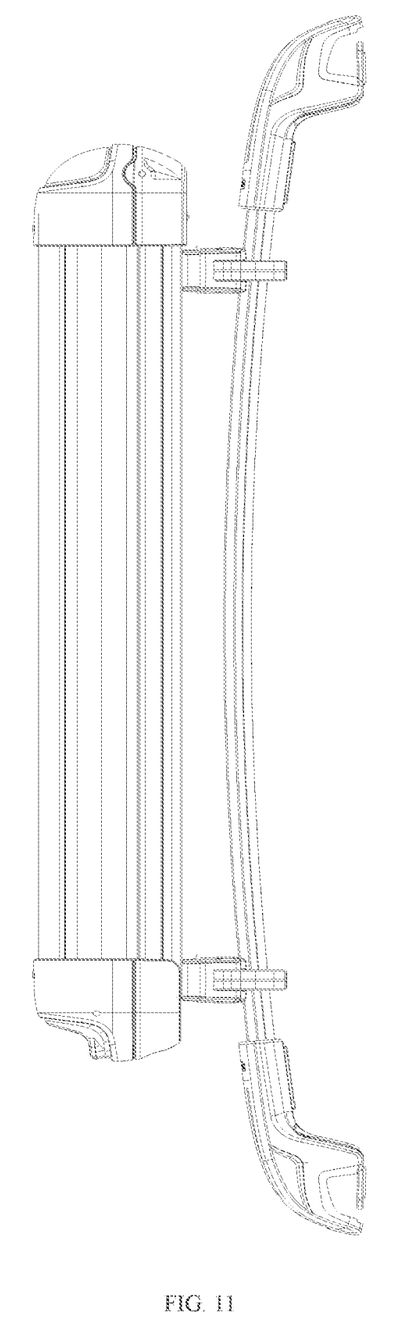
FIG. 11 is a state schematic diagram in, which an embodiment of the present invention is mounted on a luggage rack.

FIG. 9 to FIG. 11 show the assembling process of the snowboard carrier and the luggage, rack at the automobile roof according to the present invention. In the first step, a fixing frame 3 close to a sliding end of a sliding plate 2a is mounted; in the second step, a sliding plate 2a is unlocked to slide out, and then the fixing frame 3 is mounted at this end; in the third step, an opening distance between two clamping jaws is adjusted by the clamping jaw adjusting structure, and the clamping jaws are grasped on an aluminum rod of a luggage rack. At this time, mounting is completed. When it is necessary to place a snowboard/ sleigh, a pressing cover body 802 is pressed, so that the pressing cover body 802 and the first lower cover 7 are unlocked, the sliding plate 2a is drawn out, and the snowboard is placed. The pressing cover body 802 is pressed, so that the pressing cover body 802 and the first lower cover 7 are locked, and then an anti-theft lock 805 is used for further locking, that is, the snowboard/sleigh is mounted, and the snowboard can be taken through reverse operation.

By adoption of the technical solution of the present invention, the aluminum rod of the luggage rack is grasped by the clamping jaws so as to be fixed on the automobile roof. The luggage rack aluminum rods of different sizes can be adapted by adjusting the opening distance between the two clamping jaws, and the sleigh can be taken by sliding out the sliding board. The advantages of convenient and simple operation and high universality, and the anti-theft function are achieved.

The above is merely illustrative of the preferred embodiments of the present invention and is not intended to limit the present invention, and various changes and modifications may be made by those skilled in the art. Any modifications, equivalent substitutions, improvements, etc. made within the spirit and scope of the present, invention should be included within the protection scope of the present invention.

What is claimed is:

1. A snowboard carrier for an automobile roof, comprising a sleigh rack, wherein a fixing frame is mounted on the sleigh rack, and the fixing frame comprises a clamping jaw base and two clamping jaws;
   the clamping jaw base is mounted on the sleigh rack;
   the two clamping jaws are ranged oppositely and are rotatably mounted on the clamping jaw base through respective hinge pieces; and
   a clamping jaw adjusting structure is arranged on the clamping jaw base, and the clamping jaw adjusting structure acts on the clamping jaws to make the clamping jaws rotate so as to adjust an opening distance between the two clamping jaws;
   wherein the clamping jaw adjusting structure is a telescopic assembly, a telescopic direction of the telescopic assembly is perpendicular to a rotating center line of the clamping jaws, and a telescopic moving part of the telescopic assembly is linked with the clamping jaws so as to push the clamping jaws to rotate about the respective hinge pieces;
   wherein the telescopic assembly comprises an adjusting bolt and an adjusting nut sleeved with the adjusting bolt in a threaded manner; and
   a telescopic limiting piece is arranged on the clamping jaw base, the telescopic limiting piece acts on the adjusting nut to restrain the adjusting nut from advancing and retreating along an axial direction of the adjusting bolt, and the adjusting bolt is linked with the clamping jaws to drive the clamping jaws to rotate about the respective hinge pieces;

wherein the sleigh rack comprises an upper clamping plate and a lower clamping plate which cooperate with each other, and the upper clamping plate is assembled on the lower clamping plate in an opening and closing manner;

the fixing frame is mounted on the lower clamping plate, the adjusting bolt movably passes through the lower clamping plate and extends into the clamping jaw base, and a head part of the adjusting bolt is located between the upper clamping plate and the lower clamping plate;

after the upper clamping plate is opened relative to the lower clamping plate, the head part of the adjusting bolt is exposed; and after the upper plate is closed relative to the lower clamping plate, the head part of the adjusting bolt is hidden in the sleigh rack;

wherein the tail ends of the two clamping jaws are located between the head part of the adjusting bolt and the adjusting nut, and the tail ends of the two clamping jaws respectively abut against the adjusting nut;

each hinge piece is a pin shaft, an expanding torsional spring is sleeved on the rotating pin shaft, and two ends of the expanding torsional spring are respectively fixed on the clamping jaws and the clamping jaw base; and when the adjusting nut moves towards the head part of the adjusting bolt, the two clamping jaws are pushed to move, so that the head parts of the two clamping jaws are close to each other, and the expanding torsional spring is compressed to accumulate energy.

2. The snowboard carrier for the automobile roof according to claim 1, wherein the clamping jaw adjusting structure is a rotating assembly, the respective hinge pieces are fixedly connected to the clamping jaws in a circumferential direction, and an output shaft of the rotating assembly is in transmission connection with the respective hinge pieces so as to drive the clamping jaws to rotate about the respective hinge pieces.

3. The snowboard carrier for the automobile roof according to claim 1, wherein the clamping jaw adjusting structure is a clamping and force-accumulating assembly, the clamping and force-accumulating assembly comprises a force-accumulating spring, and the force-accumulating spring is connected between the clamping jaws and the clamping jaw base; and when the clamping jaws rotate about the respective hinge pieces and a distance between the two clamping jaws is increased, the clamping jaws compress the force-accumulating spring to accumulate energy, such that the force-accumulating spring generates a tendency to push the two clamping jaws to rotate and reduce the distance.

4. The snowboard carrier for the automobile roof according to claim 1, wherein the clamping jaw base is box-shaped, a tail part of each of the clamping jaws is rotatably mounted in the clamping jaw base, the clamping jaw base is provided with avoidance openings respectively corresponding to the two clamping jaws, a head part of each of the clamping jaws extends out of the corresponding avoidance opening to form a clamping part, and the clamping part is away from the sleigh rack.

5. The snowboard carrier for the automobile roof according to claim 1, wherein the sleigh rack is long strip-shaped, and one fixing frame is mounted at each of two ends of the sleigh rack.

6. The snowboard carrier for the automobile roof according to claim 1,
wherein the adjusting nut is connected to a limiting block, the clamping jaw base is provided with a limiting groove corresponding to the limiting block, the limiting block is assembled in the limiting groove, a length direction of the limiting groove is parallel to a length direction of the adjusting bolt, and the limiting block is retrained by the limiting groove to move along the length direction of the limiting groove.

7. The snowboard carrier for the car top according to claim 1,
wherein the upper clamping plate is superimposed on the lower clamping plate, either ends of the upper clamping plate and the lower clamping plate are hinged mutually, and lock catch connecting mechanisms are arranged at free ends of the upper clamping plate and the lower clamping plate.

8. A snowboard carrier for the automobile roof, comprising a sleigh rack, wherein a fixing frame is mounted on the sleigh rack, and the fixing frame comprises a clamping jaw base and two clamping jaws;

the clamping jaw base is mounted on the sleigh rack;

the two clamping jaws are ranged oppositely and are rotatably mounted on the clamping jaw base through respective hinge pieces; and a clamping jaw adjusting structure is arranged on the clamping jaw base, and the clamping jaw adjusting structure acts on the clamping jaws to make the clamping jaws rotate so as to adjust an opening distance between the two clamping jaws;

wherein the clamping jaw adjusting structure is a telescopic assembly, a telescopic direction of the telescopic assembly is perpendicular to a rotating center line of the clamping jaws, and a telescopic moving part of the telescopic assembly is linked with the clamping jaws so as to push the clamping jaws to rotate about the respective hinge pieces;

wherein the telescopic assembly comprises an adjusting bolt and an adjusting nut sleeved with the adjusting bolt in a threaded manner; and a telescopic limiting piece is arranged on the clamping jaw base, the telescopic limiting piece acts on the adjusting nut to restrain the adjusting nut from advancing and retreating along an axial direction of the adjusting bolt, and the adjusting bolt is linked with the clamping jaws to drive the clamping jaws to rotate about the respective hinge pieces;

wherein the sleigh rack comprises an upper clamping plate and a lower clamping plate which cooperate with each other, and the upper clamping plate is assembled on the lower clamping plate in an opening and closing manner;

the fixing frame is mounted on the lower clamping plate, the adjusting bolt movably passes through the lower clamping plate and extends into the clamping jaw base, and a head part of the adjusting bolt is located between the upper clamping plate and the lower clamping plate;

after the upper clamping plate is opened relative to the lower clamping plate, the head part of the adjusting bolt is exposed; and after the upper plate is closed relative to the lower clamping plate, the head part of the adjusting bolt is hidden in the sleigh rack;

wherein a bolt adjusting wrench is movably embedded in the sleigh rack.

9. The snowboard carrier for the automobile roof according to claim 8,
wherein the adjusting nut is connected to a limiting block, the clamping jaw base is provided with a limiting groove corresponding to the limiting block, the limiting block is assembled in the limiting groove, a length direction of the limiting groove is parallel to a length direction of the adjusting bolt, and the limiting block is retrained by the limiting groove to move along the length direction of the limiting groove.

10. The snowboard carrier for the car top according to claim 8,
wherein the upper clamping plate is superimposed on the lower clamping plate, either ends of the upper clamping plate and the lower clamping plate are hinged mutually, and lock catch connecting mechanisms are arranged at free ends of the upper clamping plate and the lower clamping plate.

* * * * *